Figures 5, 6:
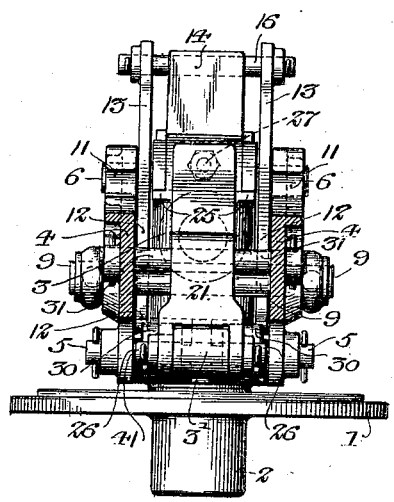

No. 877,126. PATENTED JAN. 21, 1908.
O. A. ROSS.
TROLLEY POLE CONTROLLER.
APPLICATION FILED AUG. 6, 1906.
3 SHEETS—SHEET 1.
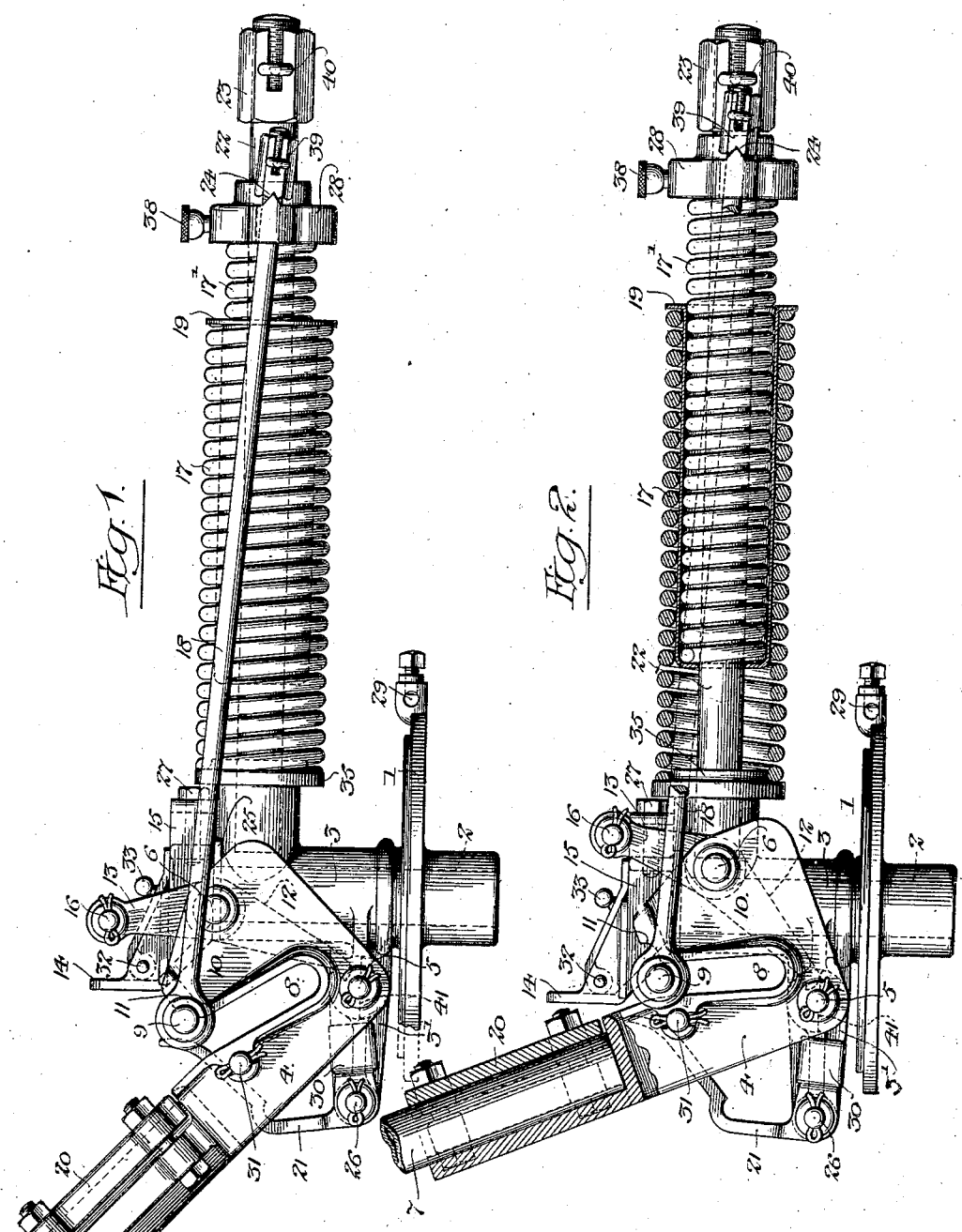

No. 877,126.　　　　　　　　　　　　　　　　PATENTED JAN. 21, 1908.
O. A. ROSS.
TROLLEY POLE CONTROLLER.
APPLICATION FILED AUG. 6, 1906.
3 SHEETS—SHEET 2.
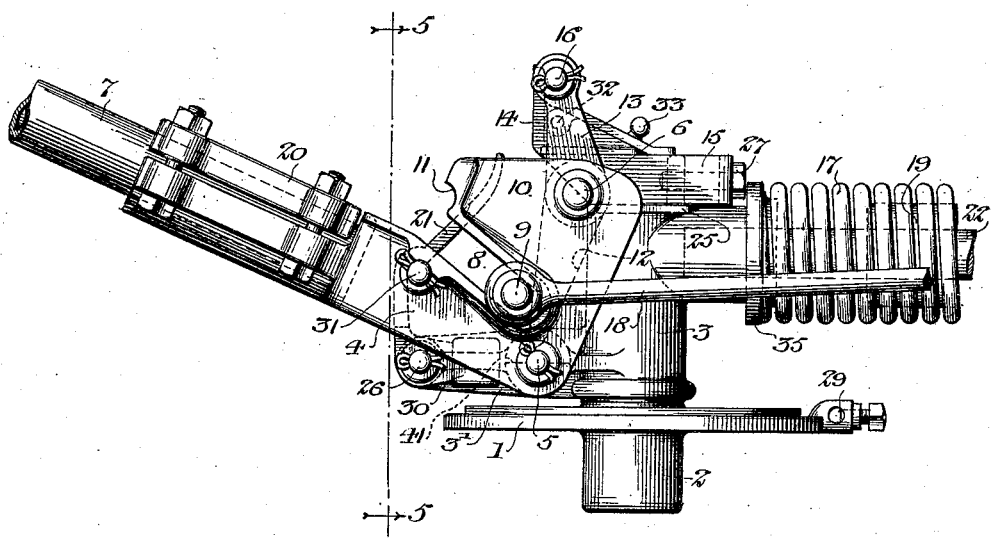

No. 877,126. PATENTED JAN. 21, 1908.
O. A. ROSS.
TROLLEY POLE CONTROLLER.
APPLICATION FILED AUG. 6, 1906.

3 SHEETS—SHEET 3.

Witnesses:— Inventor:—
Oscar A. Ross
by Hill & Hill
attys.

UNITED STATES PATENT OFFICE.

OSCAR A. ROSS, OF CHICAGO, ILLINOIS.

TROLLEY-POLE CONTROLLER.

No. 877,126.  Specification of Letters Patent.  Patented Jan. 21, 1908.

Application filed August 6, 1906. Serial No. 329,323.

*To all whom it may concern:*

Be it known that I, OSCAR A. ROSS, a citizen of the United States, residing at Chicago, in the county of Cook and State of Illinois, have invented certain new and useful Improvements in Trolley-Pole Controllers, of which the following is a description.

My invention belongs to that class of devices known as trolley pole controllers, and has for its object the production of a simpler, cheaper and more efficient device for the purposes set forth.

This invention is in the nature of an improvement on trolley poles embracing the general features of my invention described in my pending application Serial No. 295,702, filed January 12th, 1906, or on similar automatic retrieving trolley poles where such devices are desired. The controller is placed in any convenient or preferred place on a car or other vehicle. In my preferred device the trolley pole after jumping off the trolley wire automatically drops down below the wire and cross-wires and is there securely and automatically locked or caught, thus preventing injury to the pole and cross-wires, as well as to property and persons in the vicinity. The pole is securely locked in this position below the trolley wire until the parts are thrown back into operative position.

To this end my invention consists in the novel arrangement, construction and combination of parts herein shown and described and more particularly pointed out in the claims.

In the accompanying drawings wherein like reference numerals indicate like or corresponding parts; Figure 1 is a side view of the preferred form of my locking device as applied to my preferred form of base, the trolley pole being in operative position, (complete pole and trolley wire not shown.) Fig. 2 is a side elevation of the same, showing the position of the parts after the trolley wheel has jumped from the wire. Fig. 3 is a partial side elevation of my preferred complete device showing the position of the parts after the pole has dropped below the trolley wire, the same being securely locked in that position. Fig. 4 is a partial side elevation of the same showing the returning of the parts to their operative positions. Fig. 5 is a cross-sectional view taken on line 5—5 of Fig. 3, and Fig. 6 shows a partial side elevation of a modified form.

Referring to the drawings, wherein my preferred form of locking device 21 is shown as applied to a trolley pole, and associated parts constructed substantially as shown in my said previous application, 1 is a stand of a form as is usually employed in trolley car construction, a pin 2 being secured thereto in any suitable manner. The stand 1 and pin 2 pivotally support my preferred form of base 3, the weight of the pole base and parts being sufficient to keep the base on its seat on the stand. It is obvious that positive means may be employed to keep the base on its seat if desired.

In order to make clear the purpose and operation of my improved device, an explanation of the complete device is given. In my preferred construction I use what might be termed a supporting member, the same being designated in the drawings by the reference numerals 4—10, pivotally secured or supported on the base 3 as at 5, in any preferred or suitable manner. To this supporting member I preferably clamp the pole 7, a clamping member 20 being shown in the drawings. The supporting member may be in the form of a bell crank or as shown in Fig. 6, the depression or clearance 8 of the other figures, may be in the form of a slot.

To normally hold the wheel of the trolley pole on the trolley wire (not shown) a pressure is exerted on the supporting member 4—10 as at the point 11 (Fig. 1). In my preferred construction springs 17—17′, suitably connected to the pin 9 exert the necessary pressure. The springs 17—17′ and a yoke or cap 28 are placed on the extension 22 on the base, rods 18 or their equivalent being used to connect the yoke 28 and the pin 9. When the trolley wheel jumps from the trolley wire, the springs or tension members cause the pole 7 to take a position similar to that shown in Fig. 2 the cam faced member 15 forcing the pin 9 from its seat. The pin slides into the clearance 8 as shown in Fig. 3, thus changing, that is reducing the leverage of the tension members on the supporting member so that the pole by reason of its weight drops below the trolley wire and is securely locked as shown in Fig. 3. It is obvious that the outward travel of the yoke 28 may be so regulated by the lock-nut 23, that there will be no pressure exerted on the pin 9 by the tension members at the point where the pin is forced into the clearance.

The clearance or depression 8 is so arranged and the parts so proportioned that when the pole drops into the position shown in Fig. 3, the leverage of the tension members on the supporting member will be such as to cushion the fall of the pole. To keep the pole from springing up or bouncing after it has dropped my preferred form of lock or catching member 21 is provided. This catch or lock 21 as shown is pivotally secured to the base 3 or equivalent part to engage the supporting member or its equivalent, the pin 31 or its equivalent being provided on the supporting member for that purpose. When the trolley pole is in contact with the trolley wire, the lock 21 is in a position as indicated in Fig. 1, being held in that position by the weights 30 or as shown in Fig. 6 by the resilient member 34. When the leverage on the supporting member is reduced the pole drops down, the supporting member is caught by the lock as shown in Fig. 3 and the pole thus prevented from rising again or bouncing until the supporting member is released.
To return the pin 9 to its operative position in the seat 11, I preferably provide an extension or lock 14 on the base 3, and also the members 13—13 which are pivotally secured to the supporting member as at 6 in any preferred or suitable manner. As is shown these members may be connected by a pin 16 or the like adapted to engage the extension 14 when the pin 9 is being returned to its operative position. A grease cup 38 may be placed on the yoke 28 if desired (see Figs. 1 and 2), as may also a cover 33 be placed on the base as shown making another grease cup. A convenient way of attaching conducting wires is shown at 29.
Referring to Fig. 6, to retard the movement of the pole upward caused by its momentum after leaving the trolley wire, a collar 35 adapted to slide on the extension 22 is provided. This collar is provided with extended portions or lug members 36, and is guided by the lug members 37 on the base 3. As the pole flies up, and moves about the point 5 as a center the part 13 of the members 12—13 engages the lug member 36, while the part 12 of 12—13 rests on the extension 3' at the point 41, so that further movement of the pole upward is against the pressure of the springs 17—17' thus retarding its movement.
The operation of my device is as follows. Referring to Fig. 1, in which the trolley wheel is on the trolley wire, the pressure of the tension members exerted on the supporting member tends to force and resiliently hold the trolley on the wire. As the pole jumps off from the trolley wire, the pole flies up and the cam faced extension 15 changes the seat of the pin 9 thus reducing the leverage of the tension members on the supporting member. The upward movement of the pole is resiliently checked by the retarding means before mentioned (the retarding means may be omitted if so desired) and its weight causes it to drop into the position shown in Fig. 3. In this position it is caught and securely locked or controlled by the locking member 21. The pole then in this position is down below the wire and cross-wires, and securely held there and prevented from bouncing. If now the pole is pulled downward as indicated in Fig. 4, the pin 6 moves about the pin 5 as a center and the pin 16 of the arm 13 contacts with the extension 14 on the base 3, forming a compound lever so that the arms 12 lift the pin 9 back to its operative seat 11 in the supporting member. The pole may now be permitted to rise to its operative position on the trolley wire.

It will be noted that during the time that pin 9 is in its seat 11, the lock 21 is held in a position which does not permit it locking on pin 31, but after pin 9 has left the seat 11 and is at the seat in the slot 8, the lock 21 is free to catch on pin 31, and thus lock the pole in a position below the trolley wire. It will also be observed that owing to the novel form of design of my preferred form of lock or controller, it is pushed out of the way of the pin 9, while the trolley pole is returning to its operative position on the wire.

Having thus described my improvement it is obvious that various immaterial modifications may be made in my device without departing from the spirit of my invention, hence I do not wish to be understood as limiting myself to the exact form and construction shown.

Having thus described my invention, what I claim as new, and desire to secure by Letters Patent is:

1. In a device of the kind described, a base and a trolley pole in combination with resilient retaining means, a supporting member provided with two retaining seats therein adapted to support the pole at different angles of inclination, means for changing the retaining means from one seat to the other seat comprising a disengaging member, and a reëngaging member carried by said supporting member, and means for automatically locking said pole in a depressed position.

2. In a device of the kind described and in combination, a pivotally supported trolley pole with an extension on the lower end thereof, said extension provided with a retaining seat therein and a receding clearance between said seat and the trolley pole, a movable resilient connecting member operatively coöperating with said extension at the seat therein, means for forcing said movable member from its seat, means for automatically locking the same in an inoperative position, and means for normally restoring the same to its seat for its operative position.

3. In a device of the kind described and in combination, a base, a trolley pole pivotally supported upon the base and provided with a bell crank extension with a depression in its free end and a receding clearance between said depression and the trolley pole, a resilient means for retaining the pole in a normal operative position provided with a movable member adapted to be positioned in said depression when said pole is in its operative position, and when forced therefrom to move along said clearance, means for forcing said movable member out of the depression when the trolley pole rises above its normal position, and means for locking the said movable member in said clearance.

4. In a device of the kind described and in combination, a stand, a base, a trolley pole pivotally supported upon the base provided with a bell crank extension with a seat in its free end and a receding clearance between said seat and the trolley pole, means for retaining the pole in operative position provided with a movable member adapted to be positioned in said seat when the pole is in its operative position and when forced therefrom to move along said clearance, means for forcing said movable member out of its seat when the pole rises above its operative position, means for locking said movable member in said clearance, and means for returning the movable member to its seat.

5. In a device of the kind described, and in combination, a base, a trolley pole, a supporting member arranged on said trolley pole and provided with two retaining depressions, one arranged above the other, a movable resilient supporting member arranged to coöperate with said depressions, means for automatically forcing the movable member from engagement with the upper retaining depression when the pole rises above its operative position and permitting it to automatically seat in the lower depression, means for automatically locking said movable member in the lower depression, and means for restoring the movable member to engagement with said upper retaining depression.

6. In a device of the kind described and in combination, a stand, a base pivotally supported upon said stand, a trolley pole pivotally secured to said base, means for retaining said pole in operative position on a line wire comprising a resilient member, a yoke and connecting rods therefor, an adjustable cam face member adapted to change the point of attachment of the retaining means on the pole to permit the pole to drop below its operative position, and means for locking said pole in its depressed position.

7. In a device of the kind described and in combination, a pivotally supported trolley pole with an extension on the lower end thereof, said extension provided with a retaining seat therein and a receding clearance between the said seat and the trolley pole, a movable resilient connecting member operatively coöperating with said extension at the seat therein, means for forcing said movable member from its seat, means for automatically locking the same in an inoperative position, and means for normally restoring the same to its seat for its operative position, comprising a restoring member pivotally carried by said pole extension.

8. In a device of the kind described and in combination, a pivotally supported trolley pole with an extension on the lower end thereof, said extension provided with a retaining seat therein and a receding clearance between said seat and the trolley pole, a movable resilient connecting member operatively coöperating with said extension at the seat therein, means for forcing said movable member from its seat, means for automatically locking the same in an inoperative position, and means operated by said pole for normally restoring the movable member to its retaining seat comprising a restoring member adapted to coöperate with the removable resilient member and the base to form a compound lever.

9. In a device of the kind described and in combination, a base, a trolley pole pivotally supported upon the base provided with a bell crank extension with a depression in its free end and a receding clearance between said depression and the trolley pole, resilient means for retaining the pole in an operative position provided with a movable member adapted to be positioned in said depression when said pole is in its operative position and when forced therefrom to move along said clearance, means for forcing said movable member out of the depression when the pole rises above its operative position, and means for locking the said movable member in said clearance, said means arranged to release the movable member by a downward pull on the free end of said pole.

10. In a device of the kind described and in combination, a stand, a base, a trolley pole pivotally supported upon the base provided with a bell crank extension with a seat in its free end and a receding clearance between said seat and the trolley pole, means for retaining the pole in its operative position provided with a movable member adapted to be positioned in said seat when the pole is in its operative position and when forced therefrom to move along said clearance, means for forcing said movable member out of its seat when the pole rises above its operative position, means for locking said movable member in said clearance arranged to unlock the same by a downward pull on the free end of said pole, and means for returning the movable member to its seat.

11. In a device of the kind described and in combination, a stand, a base pivotally supported upon said stand, a trolley pole pivotally secured to said base, means for retaining said pole in operative position on a line wire comprising a removable resilient member, a yoke and connecting rods therefor, a cam faced member adapted to change the point of attachment of the retaining means on the pole to permit the pole to drop below its operative position, means for locking said pole in its depressed position arranged to unlock the same by a downward pull on the free end of said pole, and means for restoring the retaining means to its operative point of attachment.

In testimony whereof, I have hereunto signed my name in the presence of two subscribing witnesses.

OSCAR A. ROSS.

Witnesses:
  ROY W. HILL,
  CHARLES I. COBB.